Oct. 14, 1969
J. B. LAWRENCE
3,472,034
METHOD AND APPARATUS FOR CONTROLLING
PIPELINE LAYING OPERATIONS
Filed Feb. 6, 1967
7 Sheets-Sheet 1
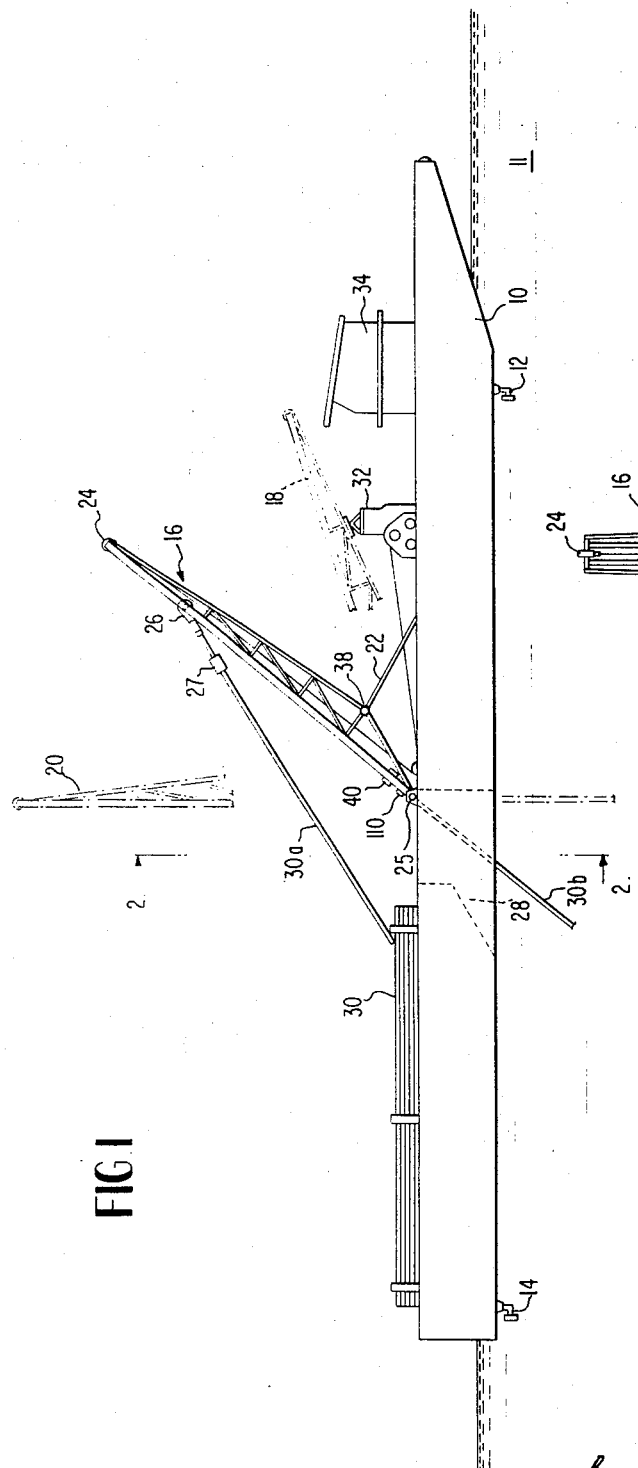
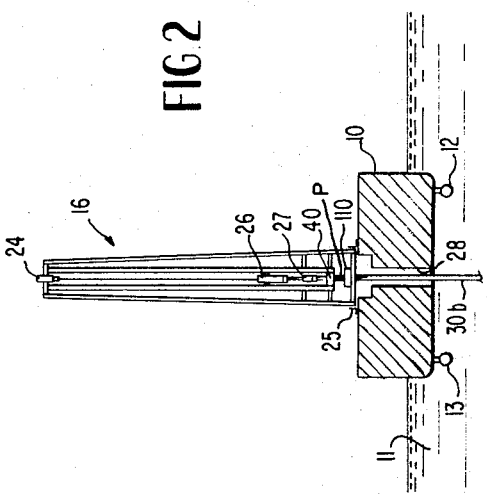
INVENTOR
JOSEPH B. LAWRENCE
BY Burns, Doane, Benedict, Swecker & Mathis
ATTORNEYS

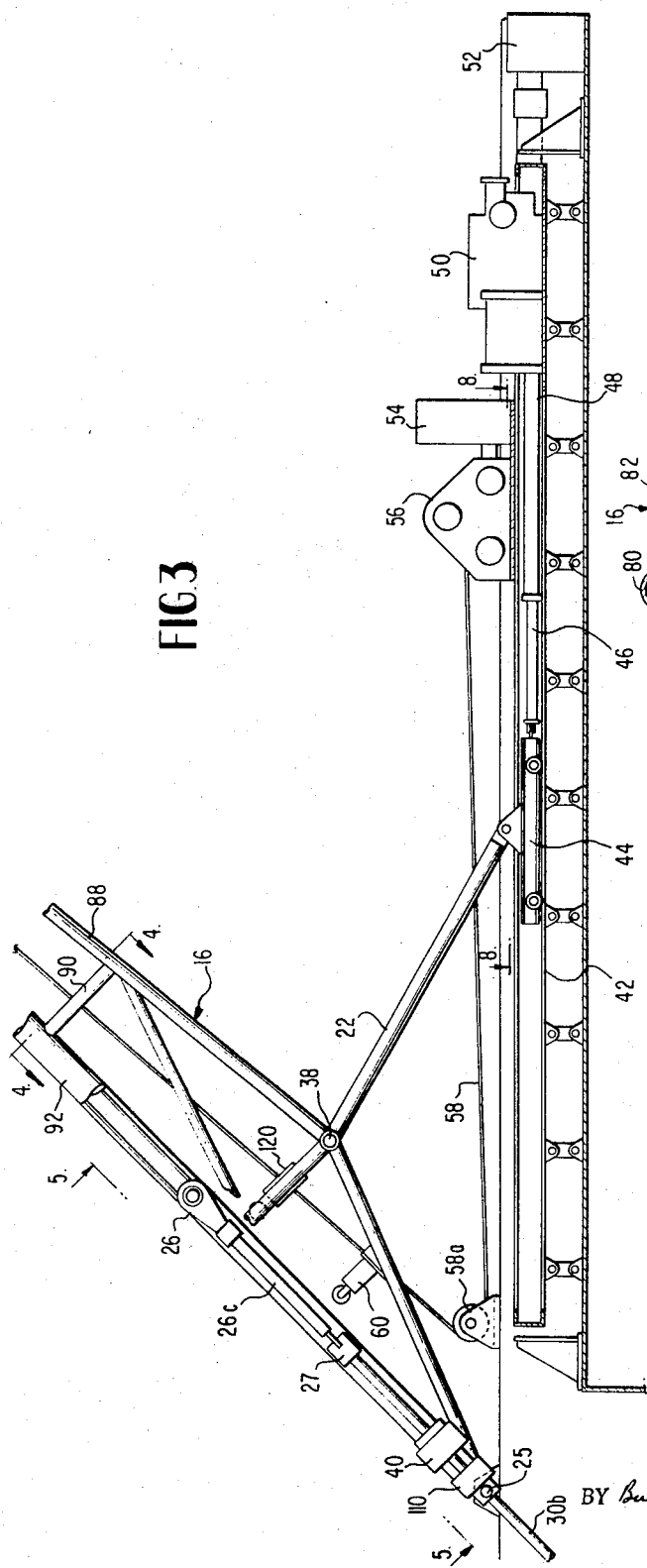
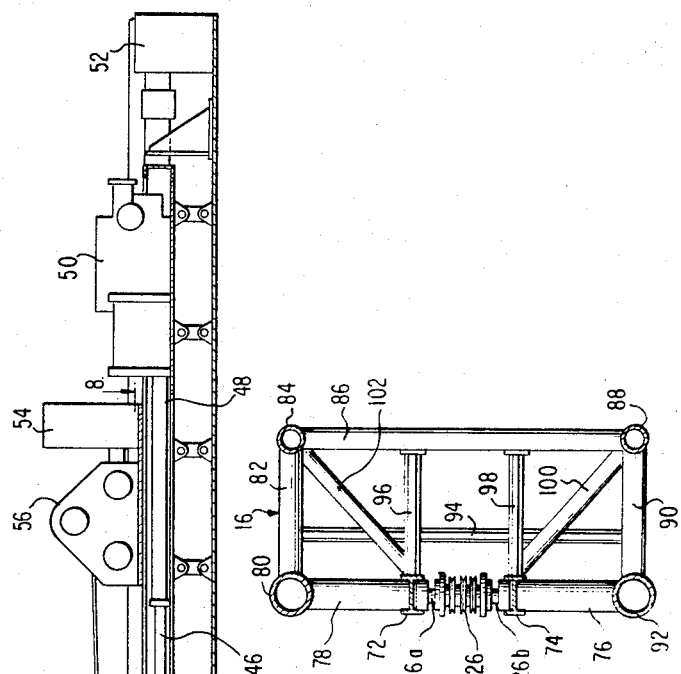

Oct. 14, 1969  J. B. LAWRENCE  3,472,034
METHOD AND APPARATUS FOR CONTROLLING
PIPELINE LAYING OPERATIONS
Filed Feb. 6, 1967  7 Sheets-Sheet 5
FIG.5
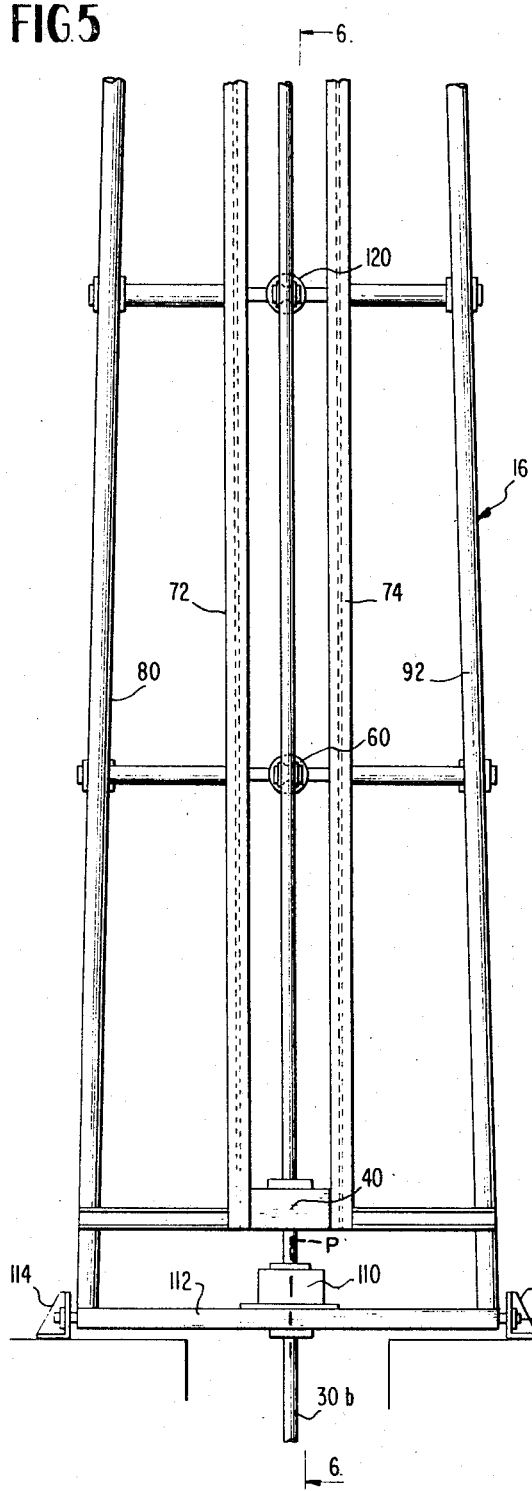
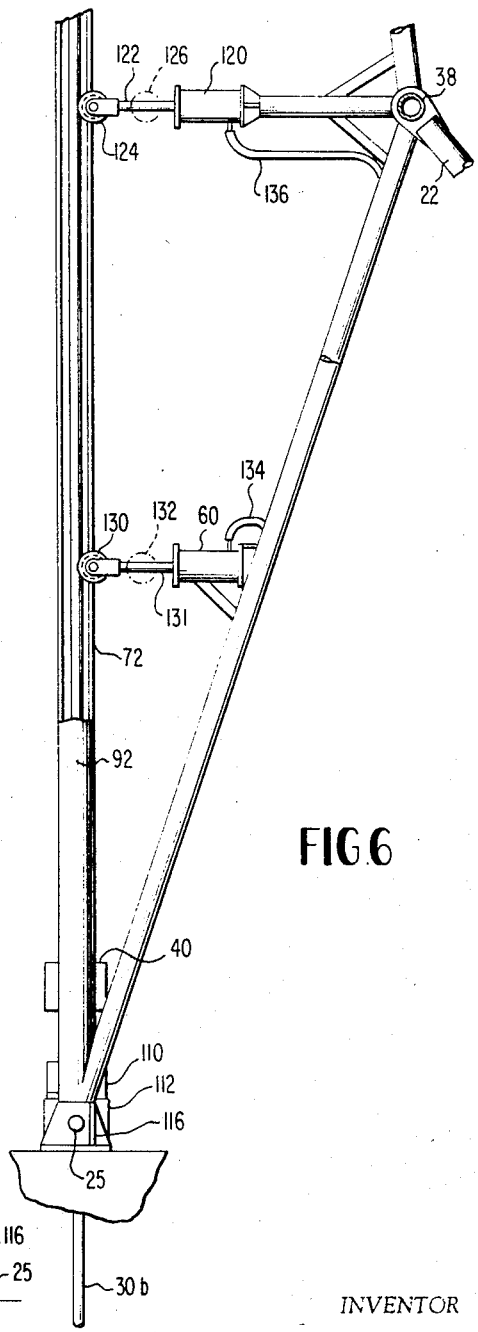
FIG.6
INVENTOR
JOSEPH B. LAWRENCE
BY *Burns, Doane, Benedict, Swecker & Mathis*
ATTORNEYS

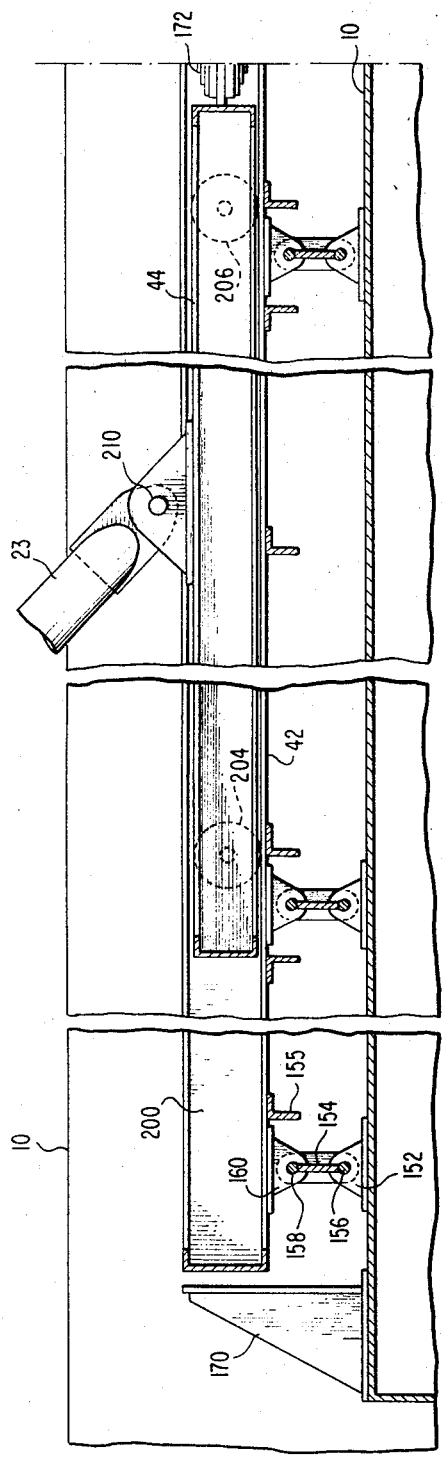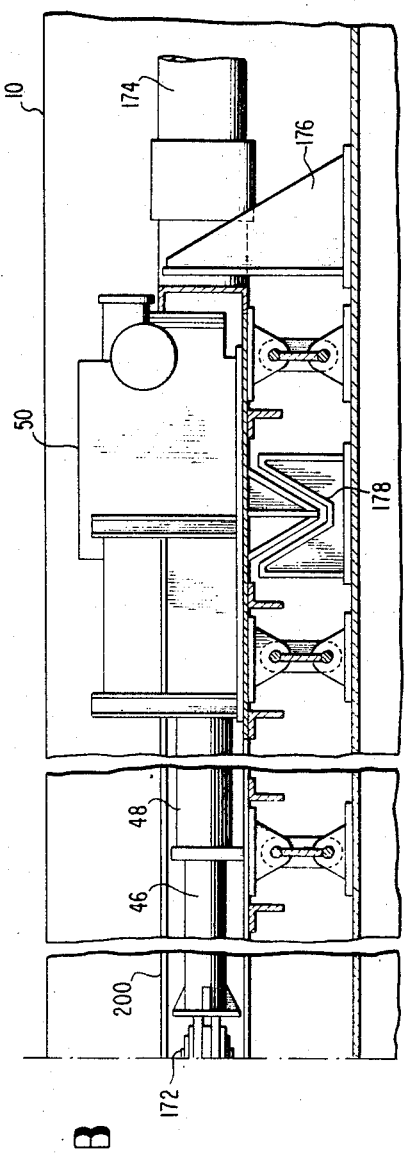

Oct. 14, 1969  J. B. LAWRENCE  3,472,034
METHOD AND APPARATUS FOR CONTROLLING
PIPELINE LAYING OPERATIONS
Filed Feb. 6, 1967  7 Sheets-Sheet 5
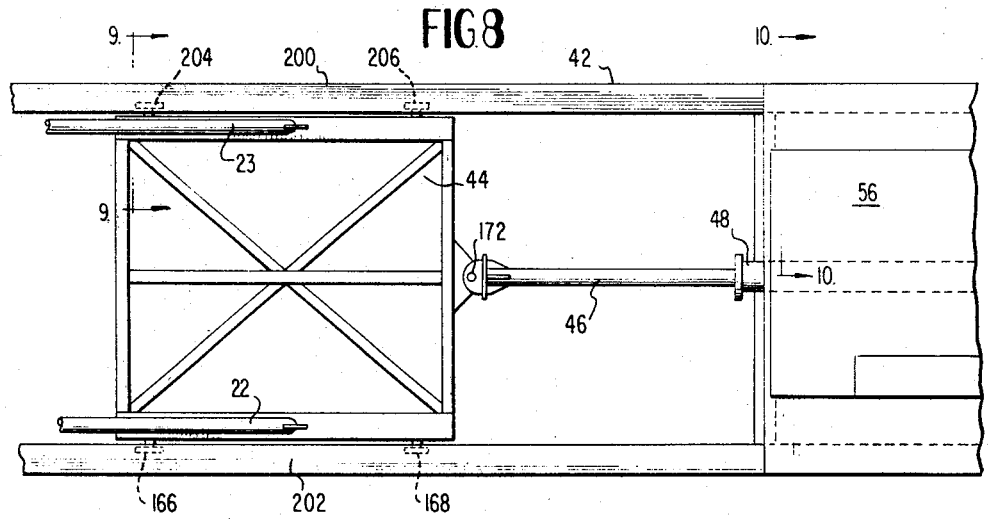
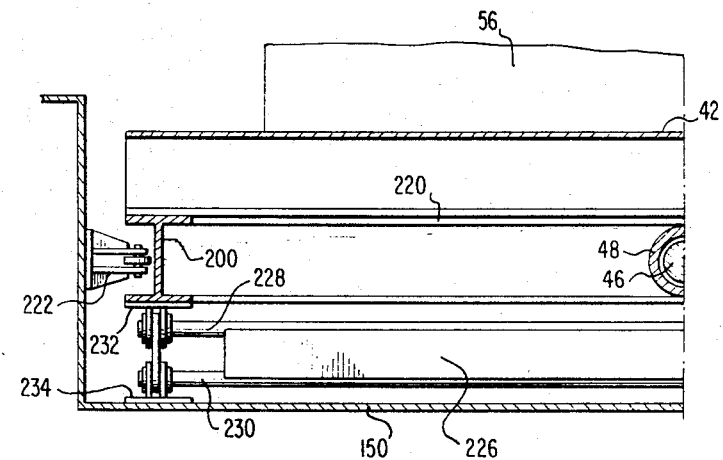
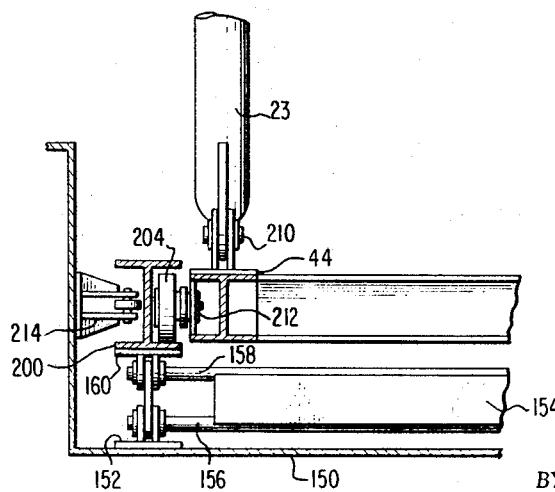
INVENTOR
JOSEPH B. LAWRENCE
BY *Burns, Doane, Benedict, Swecker & Mathis*
ATTORNEYS

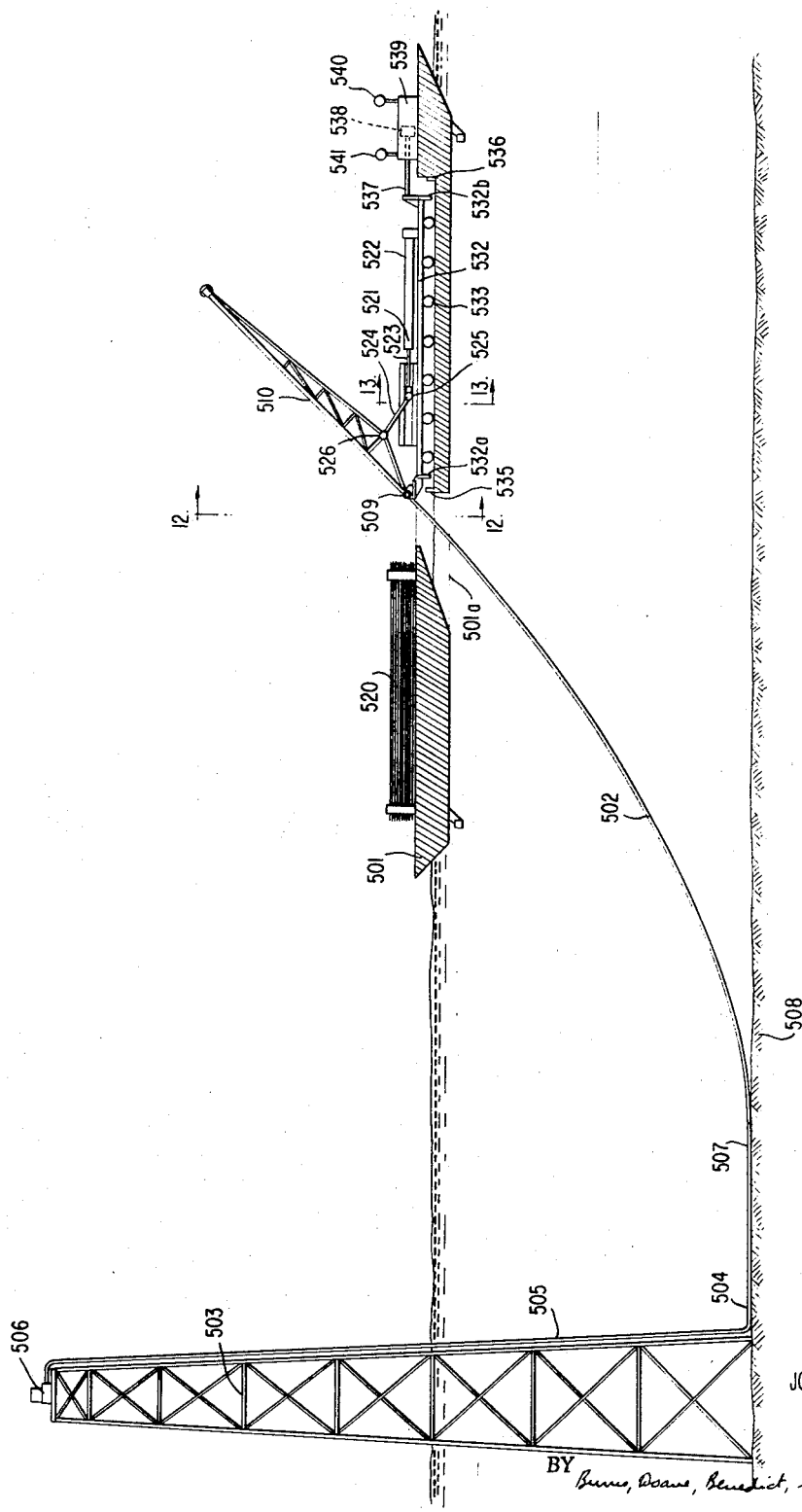

Oct. 14, 1969

J. B. LAWRENCE 3,472,034

METHOD AND APPARATUS FOR CONTROLLING
PIPELINE LAYING OPERATIONS

Filed Feb. 6, 1967

INVENTOR

JOSEPH B. LAWRENCE

BY *Burns, Doane, Benedict, Swecker & Mathis*

ATTORNEYS

United States Patent Office 3,472,034
Patented Oct. 14, 1969

3,472,034
METHOD AND APPARATUS FOR CONTROLLING PIPELINE LAYING OPERATIONS
Joseph Benton Lawrence, Houston, Tex., assignor to Brown & Root, Inc., Houston, Tex., a corporation of Texas
Continuation-in-part of application Ser. No. 204,915, June 25, 1962. This application Feb. 6, 1967, Ser. No. 614,290
Int. Cl. B63b *35/04;* F16l *1/00*
U.S. Cl. 61—72.3                            13 Claims

ABSTRACT OF THE DISCLOSURE

A method and apparatus for laying elongate flexible means on submerged surfaces wherein control over the laying operation is maintained in accordance with measured changes in force imposed on the elongate flexible means in response to the lengthening of the pipeline from the lay vessel or movement of the lay vessel.

This application is a continuation-in-part of my prior application Ser. No. 204,915 filed June 25, 1962, and now abandoned.

Background and objects of invention

During the past few years, increased petroleum exploration activity and production activity have taken place in remote areas of the world. Marketing of petroleum products which have been discovered and produced in such remote areas has been hindered by the lack of adequate pipeline facilities. In particular, difficulty has been experienced in laying pipelines where the terrain has been difficult to travel and penetrate for digging pipeline trenches. Where practicable, pipelines have been laid on the beds of bodies of water, thereby eliminating the necessity of digging trenches in which to lay the pipelines and eliminating the attendant need of covering the trenches after such pipelines have been laid.

In laying pipelines on the beds of bodies of water, considerable difficulty has been encountered in providing adequate apparatus for laying such pipelines. Known apparatus has not readily accomplished the objective of rapidly and effectively laying the maximum amount of pipe in a given time period when varying depths of water have been encountered. Also known pipeline laying equipment which is utilized in laying pipeline on the beds of bodies of water has not provided interrelated control apparatus so that the speed at which pipe is laid is determined by the depth of the water, by the physical characteristics of the pipe, and by the direction in which the pipeline is to be extended.

A variety of techniques have been previously developed in an attempt to efficiently lay pipelines in relatively deep water. For example, in the United States Goepfert et al. Patent No. 3,214,921, a deep-water pipeline laying technique is disclosed where control of pipeline laying operations is predicated on measurement of the pipeline inclination in the vicinity of a lay barge. However, arrangements such as this are obviously structurally complicated to the point where the pipe-laying operation itself is virtually subordinated to a highly complex control system.

It is a principal object of the invention to provide a pipe-laying operation which is effectively controlled without impairing or unduly complicating the basic pipe-laying procedure.

A further principal object of the invention is to provide a pipeline laying technique characterized by a unique control system wherein vessel movement is coordinated with pipe laying in response to measured changes in force acting on the pipeline being laid.

A further principal object of the invention is to employ such a control technique wherein vessel movement and pipe laying are coordinated in response to measurements of horizontal force imposed on a portion of the pipeline which is gripped on, or from, a lay barge or vessel.

Yet another object of the invention is to provide such a control system which is further characterized by substantially immobilizing a portion of a pipeline gripped on a lay vessel while allowing only for pipeline axial movement necessary to increase its length and the relatively inconsequential movement of the gripped portion of the pipeline necessary to transmit forces acting on the pipeline for force-measuring purposes.

A still further principal object of the invention is to provide such a pipeline laying technique where the measured changes in force acting on a gripped portion of a pipeline may be transmitted through conventional control systems, such as servo mechanisms, to conventional engine propulsion units. This enables the automatic regulation of vessel movements in accordance with changes in force imposed by a vessel on a gripped portion of a pipeline in response to either an increase in length of a pipeline or movement of a lay vessel or both of these variables.

Another object of the present invention is to provide pipe laying equipment for use on bodies of water, such equipment being characterized by its relative simplicity, effectiveness, and efficiency as compared to known, similar equipment.

Yet another object of the present invention is to provide pipe laying equipment adapted for use on bodies of water, such equipment combining in a related manner, the travel speed of the pipe laying equipment, the angle with the horizontal at which the pipe is being fed into the water, and the pull exerted on the pipe laying equipment.

A further object of the present invention is to provide pipeline laying equipment for use on a large body of water, such equipment coordinating the rate and angle of laying the pipeline and the pull of the vessel which is carrying the equipment for laying the pipeline thereby maintaining the portion of the pipeline between the vessel and the bed of the body of water in the form of a desired elevational profile such as a catenary, flexed beam, tensioned beam, or other desired configurations.

Summary of invention

An apparatus presented through this invention for accomplishing at least some of the foregoing principal objects includes floating vessel means and support means for a pipeline to be laid on a submerged surface. The support means is carried by the vessel means and includes means for gripping an upper portion of the pipeline while it is being laid on a submerged surface and extends from the vessel means to the submerged surface. The apparatus is characterized by means for measuring force acting between the vessel and the pipeline and changes in force acting on the pipeline in response to movement of the vessel means relative to a submerged portion of the pipeline laying on the submerged surface.

Another principal aspect of the invention pertains to a method for laying a pipeline on a submerged surface. In practicing this method, a pipeline is supported from floating vessel means so that an upper portion of the pipeline is gripped by gripping means carried by the floating vessel means and extends downwardly from the vessel means to a submerged surface. This method is characterized by the measuring of force acting between the vessel and the pipeline and the measuring of changes in force acting on the pipeline in response to movement of the vessel means relative to a submerged portion of the pipeline laying on a submerged surface.

Particularly significant advantages of the invention are derived when the foregoing apparatus and method are employed in the laying of pipelines in deep water, i.e., having a depth of several hundred or several thousand feet.

Other significant facets of the invention entail methods and apparatus by means of which a pipeline is gripped from a vessel so as to have an upper portion with a substantially immobilized axial orientation relative to said floating vessel means.

In the context of the foregoing method and apparatus aspects, taken either singly or jointly, there remains another especially significant facet of the invention. This facet is characterized by the controlling of vessel movement in response to measured changes in force imposed on an upper portion of a pipeline.

Contents of drawings

In describing the invention, reference will be made to preferred embodiments illustrated in the appended drawings.

In the drawings,

FIGURE 1 is an elevational view of the pipe laying equipment of the present invention;

FIGURE 2 is a plan view of such equipment taken along line 2—2 of FIGURE 1;

FIGURE 3 is an elevational view showing an enlarged portion of the pipe laying equipment of FIGURE 1 and partially broken away to show details of pipe lowering equipment;

FIGURE 4 is a plan view of the derrick of the present invention taken along line 4—4 of FIGURE 3;

FIGURE 5 is a plan view of the derrick of the present invention taken along line 5—5 of FIGURE 3;

FIGURE 6 is an enlarged, elevational view of a portion of the derrick structure of the present invention shown in FIGURE 1 broken away to show details of pipe aligning or guiding equipment;

FIGURE 7a is a cross-sectional, elevational view of the pitman portion of the pipe laying equipment of the present invention;

FIGURE 7b is a cross-sectional, elevational view of the hydraulic cylinder portion of the pipe laying equipment of the present invention;

FIGURE 8 is a plan view taken along line 8—8 of FIGURE 3;

FIGURE 9 is a cross-sectional, elevational view taken along line 9—9 of FIGURE 8;

FIGURE 10 is a cross-sectional, elevational view taken along line 10—10 of FIGURE 8;

Figure 13:
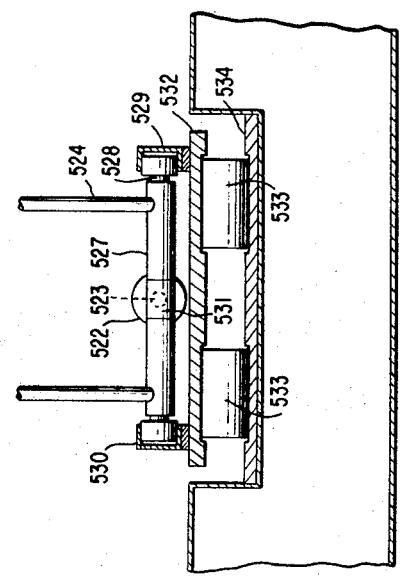
Figure 14:
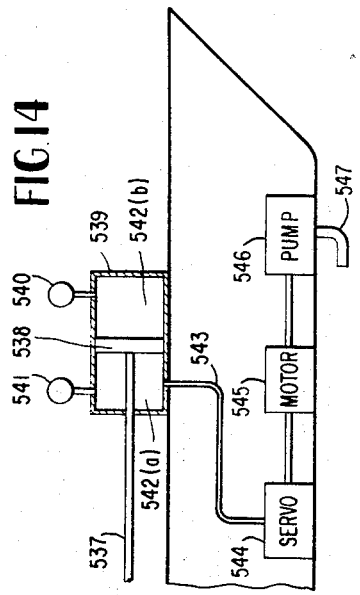
Figure 12:
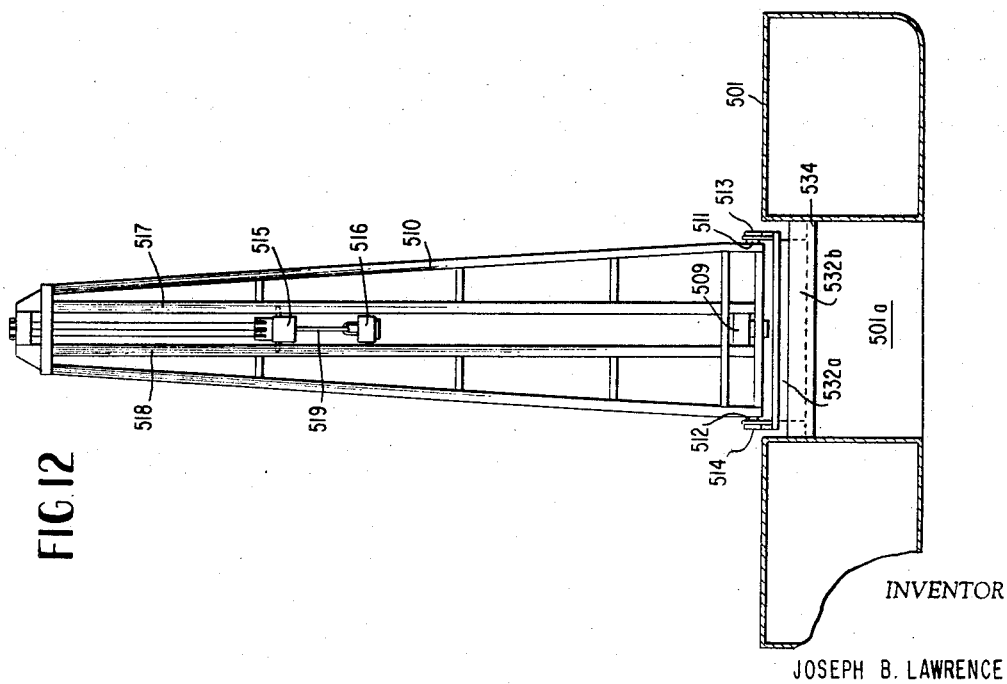

FIGURE 11 schematically illustrates, in side elevation, the laying of a pipeline away from a derrick supported riser pipe;

FIGURE 12 provides an enlarged sectional view of the FIGURE 11 system as viewed along the section line 12—12 of FIGURE 11;

FIGURE 13 provides a fragmentary, enlarged, sectional view of a portion of the FIGURE 11 system as viewed along the section line 13—13 of FIGURE 11 and illustrating structural details of a mechanism which may be employed to change the inclination at which a pipeline is substantially fixedly gripped on the vessel of the FIGURE 11 system; and FIGURE 14 provides a schematic illustration of a propulsion control system which may be incorporated in the FIGURE 11 system so as to enable vessel movements to be correlated with measured changes in force imposed on the pipeline.

Description of one embodiment of invention and its mode of operation

Briefly stated, the invention in one preferred form shown in FIGURES 1 through 10 comprises apparatus mounted on a floating vessel such as a barge, so that pipe can be laid on the bed of the body of water on which the vessel is floating. Such apparatus includes means for adding sections of pipe to the pipeline which has been laid and means for varying the feed angle of the pipe which is being fed from the vessel to maintain the unlaid section of pipeline suspended from the vessel in substantially the form of a flexed or flexed and tensioned beam or a catenary. Suitable and conventional steering apparatus may be provided on the vessel so that drift of the vessel while laying the pipe is substantially eliminated. The pull of the vessel is related to the angle at which the pipe is fed into the water. The physical characteristics of the pipe being laid and the depth of water in which the vessel is working are used in calculating the optimum angle at which the pipe is fed into the water.

Referring now to the drawings in detail, particularly to FIGURES 1 and 2, a floating vessel, such as a self-propelled barge 10 is shown on a body of water 11. The floating vessel is propelled by four jet-type propulsion devices, two of which are at 12 and 14 in FIGURE 1. Another jet-type propulsion device 13 is shown in FIGURE 2, which is a view taken along line 2—2 of FIGURE 1. Such propulsion devices are described, for example, in United States Somers Patent No. 1,007,811.

The four jet-type propulsion devices each may be rotated 360° about an axis substantially perpendicular to the bottom of vessel 10. The four jet-type propulsion devices may preferably be incorporated in a system to prevent the vessel from drifting off a selected course which is chosen when the pipeline laying operation is started. Such systems, for example, are described in United States Wanzer Patent No. 2,987,027 and Shatto, Jr., et al. Patent No. 3,187,704. Each of the devices may be operated independently of the others so that the selected course may be maintained throughout the pipeline laying operation. In this way, excessive pipeline laying along the bed of water is eliminated, thereby reducing the total length of pipeline laid and reducing the total time required for laying the pipeline. The jet-type propulsion devices, insofar as forward thrust is concerned, may be coupled by suitable throttle control means to the holding ram 52 shown in FIGURE 3, thereby controlling the thrust exerted by the propulsion devices in direct relationship to the pressure in the cylinder of holding ram 52. A more detailed explanation of this function of holding ram 52 will be given subsequently.

Vessel 10 includes a derrick 16 which is pivotal about a point 25. The derrick 16 may be moved to various angular positions with the horizontal by means of a pitman 22 and a carriage to be explained in detail subsequently. Derrick 16 may be varied in position from a substantially perpendicular position relative to the vessel 10 as shown in the dotted line derrick position 20 to a rest position shown by the dotted line position 18 of the derrick. Suitable apparatus 32 may be provided for allowing the derrick to rest in position 18. Housing 34 is shown in FIGURE 1 and contains control apparatus which will be explained in greater detail subsequently.

Floating vessel 10 has an aperture or opening 28 near pivot point 25 to allow pipe to be suspended and fed into the water. In the position of the derrick shown in FIGURE 1, sections of pipe from stack 30 may be removed as shown at 30a by means of derrick apparatus which includes clevis and shaft 24, conventional traveling block 26, and conventional elevator 27. Obviously a swivel joint may be interposed between block 26 and elevator 27 to enable rotation of a pipe section carried by elevator 27 relative to block 26. Since the derrick is positioned at an angle, suitable guide means are required for the derrick apparatus. Such guide means will be explained in greater detail subsequently.

Pipe 30b is shown suspended from the derrick apparatus, It is apparent, therefore, that the procedure for removing pipe or other tubular structures from stack 30 is conventional. In other words, a section at a time is removed from the stack and coupled to the suspended portion of the string of pipe or tubular structure indicated as 30b. The operation of the derrick apparatus is well known and understood by those skilled in the derrick and drilling art. The angle of the derrick 16 with the horizontal is controlled by the pitman 22 and related apparatus in a manner to be explained in detail subsequently. Briefly stated, the angle of derrick 16 with the horizontal is optimum when the suspended portion of the pipe or tubular structure 30b between pivot point 25 and the bed of the body of water 11 is in the form of a catenary or a long beam flexed within predetermined limits.

As those skilled in the construction art will appreciate, a true caternary is characterized by a constant horizontal component of force acting on it. Pages 142–145 of Mechanical Engineers' Handbook by Lionel S. Marks, fifth edition, published by McGraw Hill Book Company, Inc. give useful information concerning the catenary. An important feature of the present invention is providing a constant horizontal component of force acting on the tubular structure being laid in the body of water. In order for the derrick 16 to be at an optimum angle, it is necessary to know the unit weight of the tubular structure which is being laid, the physical characteristics of such tubular structure such as the yield point of the material, and the depth of the body of water in which the floating vessel 10 is operating. The speed of floating vessel 10 and the angle of the derrick may be correlated with the factors just enumerated to provide the caternary described previously.

As will be readily understood, the pipe laying operation will ordinarily be preceded by a survey of the path on a submerged surface where a pipeline is to be laid. This survey may be accomplished by reference to existing charts or may entail the initial obtaining of depth readings for various points along the pipe laying route.

Armed with information indicating the elevational profile of the submerged surface path along which a pipeline is to be laid, it then becomes a matter of conventional computations to determine the desired inclination at which a pipeline is to be gripped from a lay vessel and the desired force which should be exerted by the lay vessel on the pipeline.

The desired elevational profile of a pipeline between the lay vessel and a submerged surface is determined in accordance with the limitations on stress which are to be imposed on the pipeline.

Since metallic pipelines have a substantial resistance to flexure or bending, in many instances the pipeline portion extending from a vessel to a submerged surface may be viewed as being in the form of a flexed beam, with the lower end tangential with the submerged surface and an upper portion inclined relative to the submerged surface and supported from the vessel.

As will be appreciated, as the length of the pipeline increases, such that the resistance to flexure becomes a less significant factor in determining the pipeline profile, the pipeline will approach a catenary configuration. Obviously, however, so long as resistance to bending is a characteristic of the pipeline, and a significant factor in determining pipeline profile between the vessel and the submerged surface, a true catenary profile will not result.

Regardless of the structural characteristics of the suspended pipeline portion between the vessel and the submerged surface, for any point on the submerged surface, a pipeline profile for the suspended pipeline portion may be determined, whether in the form of a beam or a catenary, or other configurations, which will not produce pipeline stress in excess of predetermined limits.

Where a pipeline is being laid over a horizontal submerged surface, or a substantially horizontal submerged surface, for any given desired pipeline profile between the vessel and the submerged surface, the force, and particularly the horizontal force imposed by the vessel through the pipeline gripping mechanism of the vessel on the pipeline, should remain constant or within predetermined limits. Thus, either while a pipeline is being lengthened from a vessel or subsequent to the addition of sections of the pipeline to its upper end, the force exerted from the vessel on the pipeline will change. By determining these changes in force, the vessel may be moved forward, away from the previously laid pipeline portion, so as to restore the force imposed by the gripping mechanism on the pipeline to its original desired value or range. When this original force value is restored, which will generally involve a minimum pulling force, operators will know that the pipeline has again been restored to a profile previously determined as being desirable. Thus, by monitoring the force exerted by a vessel on a pipeline, and particularly the horizontal or pulling force imposed on the pipeline, an especially convenient control mechanism is provided for correlating vessel movement with pipe laying so as to maintain predetermined pipeline stress conditions.

As pipe laying proceeds over an inclined submerged surface, or over an irregular profile previously determined, it will obviously be necessary, whether the pipeline is suspended as a beam or supported as a true catenary, to change the inclination of the gripped portion of the pipeline on the vessel in accordance with changes in depth of the submerged pipeline path. For example, in order to maintain a predetermined catenary profile, the inclination of the pipeline, where it is gripped on the vessel, must be changed in accordance with the position of the vessel relative to the catenary profile. By thus adjusting the inclination of a gripped pipeline portion so as to maintain the gripped portion in generally matching conformance with the profile of a desired catenary, measurements of the horizontal force imposed by the vessel on the pipeline (which remains constant along the catenary profile) may be employed to insure that movement of the lay vessel does not substantially displace the pipeline from the desired catenary profile.

As will be apparent, where a beam profile is maintained, it will be necessary to reevaluate the force exerted by a vessel on a pipeline as the depth of the submerged surface varies. However, force change computations may be readily effected by computers or conventional techniques before pipe laying is initiated so that for any given location of a lay vessel over a pipe laying route, an optimum horizontal force exerted from the vessel on the pipeline is known. By knowing this optimum force, vessel movements can be regulated so as to coordinate vessel movement with pipe laying and either maintain this optimum force exerted on the pipeline or periodically readjust the force exerted by the vessel on the pipeline to this optimum value.

As will be obvious to those having familiarity with heavy equipment operations, this optimum force may be employed as a guideline, with it being understood that during the pipe laying operations, the force exerted by the vessel on the pipeline may vary within defined tolerances from the optimum force.

FIGURE 3 is a partial section elevational view of the derrick apparatus which is mounted on floating vessel 10. Derrick 16, as explained previously, may be of a known type construction having a traveling block 26 and elevator 27.

A conventional power tong 40 may be incorporated in the derrick 16 as an integral derrick component, as schematically shown in FIGURE 5. This provides, in the derrick, a mechanism for rotating sections of threaded pipe which are to be coupled to the upper end of a pipeline supported by a conventional pipe gripping slip mechanism 110.

Pitman 22 is coupled to derrick 16 at pivot point 38. The pitman 22, of which only one member is shown in FIGURE 3, is coupled to cross-head carriage 44 which is slidably mounted on platform 42. Piston 46 is coupled to cross-head carriage 44; piston 46 may be hydraulically powered by an hydraulic pump 50. Cylinder 48 is disposed about a portion of piston 46 and is used to provide pressure to piston 46 which in turn slidably moves carriage 44 thereby changing the position angle of derrick 16. Holding ram 52 is disposed on a fixed vessel deck portion adjacent hydraulic pump 50. Holding ram 52 includes a piston and cylinder so that movement of platform 42 is resisted by hydraulic pressure in the cylinder of the holding ram 52. In this way, a means is provided for measuring a vector of the force exerted by vessel 10 on pipeline portion 30b. As explained previously, the pressure in cylinder 52 may be used to regulate throttling of the four power units, thereby controlling the horizontal force which vessel 10 exerts on the submerged portion of pipe or tubular structure.

Hydraulic mechanism 52, whether a closed piston and cylinder assembly or a system prepressured on opposite piston sides to exert equal but oppositely directed horizontal holding forces on the platform 42 through piston rod or ram 174, will serve to substantially stabilize the position of platform 42. Nevertheless, the slightly but virtually inconsequential movable character of the platform 42 will enable the rig 16, through its horizontally movable component 23, to transmit force relationship between the vessel 10 and pipeline portion 30b to the hydraulic mechanism 52. As these force relationships vary, either as a result of increasing the length of the pipeline suspended between the vessel and submerged surface, or vary as a result of vessel movement, they are measured as a pressure change within the substantially incompressible hydraulic fluid acting on ram 174 within mechanism 52. With this arrangement, these detected pressure changes, detected for example, visually by conventional pressure gauges, may be utilized to enable an operator to correlate vessel movement and pipeline lengthening so as to maintain a desired force relationship between a vessel and pipeline and hence a desired pipeline profile. With the rig 16 mounted on a fixed deck portion of vessel 10, the platform 42 will transmit to mechanism 52 a measure of changes in force tending to pivot pipeline force about brackets 114 and 116 which are substantially aligned with gripping means 110. With rig 16 mounted on a horizontally movable deck, such as platform 42, the movable deck 42 will transmit to mechanism 52 a measure of changes in horizontal pulling or pushing force imposed by vessel 10 on pipeline portion 30b. In any event, these detected pressure changes provide a control parameter for coordinating pipe laying and vessel movement so as to maintain particular force (or force range) measurement indicative of a desired elevational profile (or profile range) for a suspended pipeline portion extending from a lay vessel to a submerged surface.

This control over the propulsion of the vessel 10 in response to changes in force imposed by the vessel 10 on the pipeline 30b, may be automatically effected by incorporating a conventional control system such as a servo mechanism between the mechanism 52 and conventional motor-driven pumps which supply motive fluid to the propulsion units of the vessel. Such servo mechanisms may be of the type described in the United States Wanzer Patent 2,987,027. Alternatively, as earlier noted, conventional pressure gauges may be employed to enable an operator to manually read the pressure of fluid within the cylinder 52 and thus be appraised of the measure of force being imposed by the vessel 10 on the pipeline portion 30b. In being appraised of this force, the operator may manually limit forward movement of the vessel 10 as pipe laying continues, so as to insure that the force imposed by the vessel on the pipeline does not fall outside of predetermined limits. It also insures that as the vessel 10 remains stationary, and pipe sections are being added, that the profile of the suspended portion of the pipeline does not depart from accepted profile limits so as to create undesired stress in a pipeline. This same manner of control, of course, can be effected where vessel movement is continuous while pipe laying proceeds. Where such continuous pipe laying operations take place, the monitoring of the force imposed by the vessel on the pipeline enables the profile of the suspended portion of the pipeline to be continuously maintained within acceptable deviation limits with reference to a predetermined optimum profile.

Power plant 54 powers the draw works mechanism 56 and may be used for other equipment on vessel 10. Draw works 56 may be of a known construction wherein a flexible line 58 is coupled through a deck mounted sheave 58a to the traveling block 26 of derrick 16.

FIGURE 4 is a sectional plan view of the derrick taken along line 4—4 of FIGURE 3. Channel members 72 and 74 are coupled to members 76 and 78 which may be of tubular construction. Channel members 72 and 74 are disposed at such distance from each other that the traveling block 26 may be mounted therebetween for slidable movement along the longitudinal axes of channel members 72 and 74. Thus, channel members 72 and 74 act as a track for traveling block 26 and prevent the traveling block from moving out of a predetermined path.

Derrick 16 of FIGURE 4 may be comprised of tubular members 80, 84, 88 and 92 disposed from each other to form substantially a rectangle. Bracing members 96 and 98 are coupled between channels 72 and 74, respectively, and between member 86 which extends between members 84 and 88. Members 82 and 90 are coupled between members 80 and 84 and 92 and 88 respectively. Member 94 is coupled between members 82 and 90. The members of the derrick may be coupled in any suitable manner such as welding.

Thus, the derrick shown in FIGURE 4 indicates that the traveling block assembly used in raising and lowering sections of pipe or other tubular structure as such pipe or other tubular structure is fed into the body of water comprises a track wherein the traveling block may move. In most known derrick construction the traveling block is completely free since the movement of the traveling block is substantially vertical with respect to the surface of the earth. However, in the present invention, the traveling block and related apparatus mounted on derrick 16 are positioned at various angles, thereby necessitating a track on which the traveling block and related apparatus may move.

FIGURE 5 is an elevational view of the derrick apparatus taken along line 5—5 of FIGURE 3. Derrick 16, as pointed out previously, is pivotally mounted about pivot point 25. Flanges 114 and 116 may be coupled to the deck of the floating vessel. A rod or bar 112, providing stub axle ends, may be journaled in and extend between the flanges 114 and 116. Thus, bar 112 defines pivot point 25. With flanges 114 and 116 secured to a fixed vessel deck, the rig 16 transmits force between the pipeline 30b and the vessel carried rig 16 to platform 42 through pitman 22. With flanges 114 and 116 carried by a movable deck such as platform 42, as subsequently described, the rig transmits horizontal force between the vessel and pipeline through gripping means 110.

The section of pipe or tubular structure 30b is supported by conventional pipe gripping means 110, i.e., slips or the like, disposed below tubing tong 40. Retractable hydraulic lifts 60 and 120, disposed centrally of rig 16 but off center of hoist cable 58 and sheave 58a, are used for alignment purposes and to insure proper clearance of the traveling block during movement along channel members 72 and 74.

With the conventional assemblage of hoisting and pipe-supporting equipment shown in FIGURES 1 and 3, pipeline sections may be added by following, in essence, the conduit adding techniques employed in drilling oil wells. Thus, elevators 27, as shown in FIGURE 1, may be connected with a pipe joint 30a as the upper end 30b of a pipeline is gripped by the slip mechanism 110. By employing a single pair of coaxial guide pins 26a and 26b, slidably received by rails 72 and 74, respectively, the block 26 and elevator 27 may be pivoted away from rig 16 to facilitate the securing of elevator 27 with pipe section 30a. Elevator 27 may carry slips to effect this securing and be connected with block 26 by a swivel connection 26c. The traveling block 26 is elevated by cable 38 so as to raise the pipe section 30a into the upper part of the rig 16. The elevated pipe section 30a is supported at the intermediate points by the extended rollers 124 and 130 as shown in FIGURE 6.

The lower end of the added section 30a may be threadably secured with the gripped pipeline portion 30b by operating the conventional power tong 40, which, as shown in FIGURE 5, may comprise an integral part of the derrick 16. As will be obvious, the conventional swivel joint 26c will facilitate rotation of elevator 27 and pipe section. After the section 30a has been coupled with the pipeline portion 30b, the slip mechanism 110 may be disengaged from the pipeline portion 30b and the section 30a by cable 38 lowered until it is in position to be gripped by the mechanism 110. The upper end of the added section 30a is then gripped by the mechanism 110 and the elevator 27 released and connected with another pipeline section so that the pipeline lengthening operation may be repeated.

While each new added section 30a is being lowered by the elevator 27, it will be necessary to retract the supporting rollers 124 and 130 to enable the elevator 27 and the traveling block 26 to move past the supporting mechanisms 60 and 120. The rollers 124 and 130 remain retracted until the traveling block 26 has been raised so as to position both the traveling block 26 and the elevators 27 above the upper supporting mechanism 120 as a new joint is being raised in the rig 16. They then are extended to support the new sections in axial alignment with the slip mechanism 110.

The operation of hydraulic lifts 60 and 120 is more apparent from the view shown in FIGURE 6. Hydraulic lift 120 includes a hydraulic supply line 136 and a piston 122 to which is coupled a roller 124. An alternate position of roller 124 is indicated by the dotted portion 126. Pitman 22 is pivotally coupled at pivot point 38. Hydraulic lift 60 is positioned between lift 120 and tubing tong 40. Hydraulic lift 60 includes a hydraulic supply line 134, piston 131, and roller 130. The position of roller 130, when the piston 131 has been retracted, is indicated by the dotted portion 132.

FIGURE 7a is a sectional elevational view of the cross-head carriage 44. The upper deck of the floating vessel 10 may be seen in the upper portion of FIGURE 7a. Lower deck 150 of the floating vessel has mounted thereon a plurality of mounting members such as member 152. Plate 154 may be coupled between shafts 156 and 158 to support member 160. As explained previously, platform 42 may move slightly to reflect force transmitting movement of movable rig portion 23 of rig 16. A plurality of plates such as plate 154 are coupled between members similar to members 152 and 160 to allow movement of platform 42.

Pitman 23 is pivotally coupled through a rod or pin 162 to member 146 which is fixedly coupled to the cross-head carriage 44. Cross-head carriage 44 is constructed to allow movement on rolling wheels 204 and 206 disposed in the carriage. Cross-head carriage 44 is moved by sliding on a web flange track assembly including track 200 with wheels 204 and 206 rotating therein. A safety stop 170 may be positioned at the end of the track to limit force transmitting movement of the platform 42 and thus limit movement of carriage 44 relative to vessel 10. A suitable pin connection 172 may be used to couple the cross-head carriage 44 to the piston 46 shown in FIGURE 7b.

FIGURE 7b is a sectional elevational view of the hydraulic piston arm and cylinder assembly used for driving the cross-head carriage 44. An hydraulic piston 46 is positioned in cylinder 48 which is coupled to hydraulic pump equipment 50 in a known manner.

A member 174, connected to and extending from platform 42, is coupled to an hydraulic holding ram which was identified in FIGURE 3 as unit 52. A safety stop 176 may be coupled near and laterally adjacent to member 174 to serve as a stop similar to the safety stop 170 shown in FIGURE 7a. Alternate safety stop arrangement 178 may be provided to limit the downward movement of platform 42 when such platform is moving. Thus, cross-head carriage 44 is moved in response to pressure applied to hydraulic equipment 50 which causes movement of piston 46. Plate member 154, along with a plurality of other similar members shown in FIGURE 7a, rotates about shaft members similar to member 156, thereby allowing a slight raising and lowering of platform 42 and the hydraulic equipment 50. It is to be understood that any means may be provided for driving the cross-head carriage 44 and other related equipment as long as such means sufficiently raise and lower the derrick apparatus to selectively vary and hold the angle at which pipe or other tubular structure is suspended and lowered into the body of water. As pointed out previously, the optimum angle for the derrick is one that allows the portion of the pipe or tubular structure suspended between the floating vessel and the bed of the body of water to be in the form of a catenary. Thus, the angle of the derrick with the horizontal would be small when working in shallow water and the angle would be large, so that the derrick is almost perpendicular to the deck of the floating vessel, when working in deep water.

FIGURE 8 is a plan view of the cross-head carriage 44 and hydraulic system taken along line 8—8 of FIGURE 3. Cross-head carriage 44 is shown positioned on tracks 200 and 202 of platform 42. These tracks may be braced by transverse framing members 155. The cross-head carriage 44 moves along tracks 200 and 202 on rollers 166, 168, 204 and 206. The pitman assembly, including member 22 and member 23, is coupled to cross-head carriage 44. The cross-head carriage 44 is coupled through pin assembly 172 to piston 46 which is positioned in hydraulic cylinder 48. As explained previously, hydraulic cylinder 48 is coupled to hydraulic pump equipment 50 not shown in FIGURE 8. Cylinder 48 is disposed below draw works 56 as shown in FIGURE 8.

FIGURE 9 is a sectional elevational view taken along line 9—9 of FIGURE 8. Member 23 of the pitman is pivotally coupled through a pin assembly 210 to cross-head carriage 44. Wheel 204 is coupled to carriage 44 through a shaft and bearing assembly 212 and wheel 204 moves along track 200 of platform 42. The track 200 may be constructed of a web flange element and alignment guide unit 214 is positioned along the track 200 opposite wheel 204. It is apparent that the carriage 44 may be selectively moved and then immobilized relative to platform 42 to thereby vary and substantially maintain the angle of the derrick.

Web 154 may be welded to rod members 158 and 156. Rod members 156 and 158 are coupled, respectively, to members 152 and 160. As explained previously, member 152 is coupled to lower deck 150.

FIGURE 10 is a sectional elevational view taken along line 10—10 of FIGURE 8. Support 220 is used for supporting the draw works 56. Piston 46 is shown positioned in cylinder 48. An alignment guide unit 222, similar to alignment guide unit 214 shown in FIGURE 9, is adjacent web flange track member 200. Rods 228 and 230 are coupled in a suitable manner to support members 232 and 234 respectively. Plate 226 is coupled to rods 228 and 230. Member 232 is coupled to web flange track 200 and member 234 is fixedly coupled to lower deck 150.

Basic aspects of invention where horizontal force on pipeline is monitored

Basic method and apparatus aspects of the invention will now be summarized with respect to a pipe laying system shown schematically in FIGURES 11 through 14.

This system is unique in that it is characterized by the direct monitoring of horizontal force exerted from a lay barge on a pipeline.

As shown in FIGURE 11, the system includes a lay vessel 501 which is laying a pipeline 502 through a vessel opening 501a away from an off-shore derrick 503. The lower end 504 of the pipeline 502 is connected to the lower end of a riser pipe 505. Riser pipe 505 may extend downwardly from a well head 506 at the upper end of derrick 503.

This invention is not, itself, directed to techniques for positioning the riser 505 and the lower end 504 of the pipeline on a submerged surface so as to enable the initiation of the laying of the pipeline 502. In this connection, one acceptable technique for initiating pipeline laying is disclosed in United States Broadway et al. Patent 3,258,928.

FIGURE 11 illustrates pipeline 502 extending from a point of tangency 507 with the ocean bottom 508 to a gripping mechanism 509 on the vessel 501 so as to assume a flexed beam configuration approaching that of a catenary curve.

Gripping mechanism 509 may comprise conventional slips readily mounted on slant rig 510. Slant rig 510 may be similar to the rig previously described in FIGURES 1 through 10 or may comprise modifications of previously known slant rigs which would be obvious in light of the invention. Such slant rigs are disclosed, for example, in United States Schroeder Patent 1,829,304; United States patent to Haldeman No. 2,079,449, or United States Smith Patent 2,598,454.

As previously described with reference to the slant rig of FIGURES 1 through 10 of the present invention, slant rig 510 includes stub axles or shafts 511 and 512 which pivotally mount the lower end of the rig 510 in shaft-receiving brackets 513 and 514, respectively. A conventional traveling block 515 may be slidably and guidably mounted on rig rails 517 and 518 for axial movement toward and away from the slips 509 and carry a conventional, pipe supporting, elevator 516 such as those used on oil rigs. Elevator 516 may carry pipe gripping slips to enhance pipe gripping action.

As previously illustrated in connection with FIGURE 1, a conventional elevator 516 may be connected through a conventional rotary coupling 519 with traveling block 515. With a single pair of guide pins 515a and 515b for block 515, elevator 516 may be manipulated away from guide rails 517 and 518 so as to support one end of a pipe section extracted from pipe stack 520. The coupled elevator 516 and pipe section may then be raised by conventional hoisting means, not shown, so that the lower end of the pipe section may be coupled with an upper pipeline portion gripped by the slips 509. Conventional coupling means such as power tongs or welding heads may be used to secure the lower end of the pipe section carried by the elevated traveling block 515 and elevator 516 to the upper end of the pipeline portion gripped by the slips 509. If threaded coupling is to be effected, the conventional rotary coupling or swivel between elevator 516 and block 515 enables the necessary rotation of the added section to occur. Once the new section has been coupled with the pipeline, the slip mechanism 509 may be disengaged from gripping relationship with the pipeline and the traveling block 515 and elevator 516 lowered so as to increase the length of the submerged portion of the pipeline. By repeating this process, and coordinating the addition of pipeline sections to movement of the vessel 501 away from the derrick 503, the pipeline is laid over the desired path on the submerged surface 508.

The selective adjustment of the inclination of the gripping mechanism 509 may be obtained by an hydraulic adjusting mechanism 521, as previously described in connection with the embodiment of FIGURES 1 through 10. This mechanism may include a cylinder 522 having a horizontal axis and a piston contained within the cylinder 522 and having a horizontally reciprocal piston rod 523 aligned with the median plane of rig 510. A connecting bracket 524 is connected by a pivot connection 525 to piston rod 523 and by a pivot connection 526 to rig 510. The pivot axes of connections 525 and 526 are horizontal and parallel to the pivot axes of shafts 511 and 512.

As shown schematically with reference to FIGURE 12, bracket 524 may include a tubular base member 527 which rotatably receives a shaft 528. Shaft 528 may be stabilized for horizontal movement longitudinally along the vessel 510 by conventional, horizontal guide rails 529 and 530. Piston rod 523 may be connected to a collar 531 which is journaled on tubular member 527 so as to allow for rotation of the tubular member 527 as the position of pivot point 525 is changed by mechanism 521 so as to adjust the slope of the rig 510 and thus the inclination of the pipeline portion gripped by the mechanism 509.

As will be appreciated, the hydraulic control mechanism 521 serves to selectively adjust and fixedly maintain the inclination of the gripped portion of the pipeline 502 in the vicinity of the gripping mechanism 509.

Rig 510, including its pivot mounts 513 and 514, as well as its associated slope-adjusting mechanism 521, as shown in FIGURE 11, are preferably mounted as a whole on force-transmitting platform 532. Force-transmitting platform 532 is supported on vessel 510 for limited and virtually inconsequential, force-transmitting, horizontal movement longitudinally of this vessel. This mounting arrangement for the slant rig and its associated adjusting mechanism may include friction-reducing means such as the schematically shown roller bearings 533. As illustrated schematically in FIGURE 13, these bearings 533 may be interposed between the underside of the horizontally movable force-transmitting platform 532 and the upper surface of a fixed deck portion 534 of the vessel 510. Horizontal movement of the platform 532 and the rig 510 and adjusting mechanism 521 may be limited by the schematically shown abutments 535 and 536 carried by the vessel 510 at opposite longitudinal ends of the platform 532. These abutments are engageable with platform lips 532a and 532b.

A force-transmitting piston rod 537 is connected with and extends from platform 532 in a horizontal posture, parallel to the movement direction of the platform 532 and is connected with a piston 538 housed within an hydraulic cylinder 539.

Pressurized hydraulic fluid contained within the cylinder 539 and acting on each of opposite ends of the piston 538 may serve to resist horizontal movement of the piston rod 537 and platform 532 and thus stabilize and substantially immobilize the rig 510. However, changes in force imposed by the gripping means 509 on the pipeline 502 will be transmitted through the platform 532 and the piston rod 537 which is connected with this platform to the piston 538. These changes in force will serve to produce changes in pressure in the hydraulic fluid on each end of the piston 538 within the cylinder 539. These pressure changes may be visually indicated by conventional pressure gauges 540 and 541 communicating with the interior of the cylinder 539 at opposite ends respectively of the piston 538.

By monitoring the pressure gauges 540 and 541, a pipe-laying operator will be appraised of changes in force imposed by the vessel 501 through gripping mechanism 509 on the pipeline 502 in response to lengthening of the pipeline from the vessel 501 or longitudinal movements of the vessel 501. Thus, as a pipeline is being lengthened by the addition of sections, the vessel movement may be controlled so as to maintain the readings of the pressure gauges 540 and 541 within predetermined limits indicative of predetermined force limitations which are to be imposed by the gripping mechanism 509 on the pipeline 502. This prevents, for example, excessive pipe lengthening in relation to vessel position or movement which would overstress the pipeline 502. It may also insure that the vessel does not move too rapidly, in relation to pipe lengthening, so as to reduce the angle of entry of the pipeline into the water below a predetermined minimum penetration angle between the pipeline and a horizontal plane. It will be understood, of course, that with the FIGURE 11 arrangement, it is the horizontal force imposed by the vessel on the pipeline in the vicinity of the gripping mechanism 509 which is being measured by the mechainsm comprising piston 538, cylinder 539 and gauges 540 and 541.

Those knowledgeable in the control art will recognize that the changes in pressure within the cylinder 539 may be utilized in conjunction with conventional control mechanisms, such as hydraulic servo systems, to regulate the forward movement of the vessel 501 in an automatic fashion. Thus, whether the cylinder cavities 542a and 542b are supplied with hydraulic fluid of a predetermined and limited pressure from a conventional source, such as an accumulator, or whether these cavities are merely closed and completely filled with hydraulic fluid, changes in force acting on the platform 532 and its connected piston rod 537 will produce changes in the pressure within these cavities. Where the fluid in the cavities is pressurized, these pressure changes, either up or down from the normal cavity pressure, may be transmitted from either cavity, such as cavity 542a, through pressure conduit means 543 to a conventional servo mechanism 544. Servo mechanism 544 may be connected in a conventional fashion with a motor 545 driving a pump 546 which supplies vessel propelling fluid to a conventional, vessel propelling jet mechanism 547.

With this control system, utilizing conventional servo control concepts, forward or pipe laying movement of the vessel 501 may be regulated to insure that the forward movement of the vessel is adequate to cause the force imposed by the gripping mechanism 509 on the pipeline 502 to be within acceptable tolerances or limits of a predetermined optimum or minimum value. Generally, they will entail the restoring of a minimum acceptable pulling force.

As will also be apparent, force measuring and control systems other than hydraulic systems, may be employed. For example, the rod 537 may have one end fixed to the platform 532 and another end rigidly fixed to deck portion of the vessel 501. A strain gauge may be positioned on the rod 537 and employed to measure changes in horizontal force imposed on the pipeline 502 by the mechanism 509 and transmitted by the platform 532. Such an electronic force measuring system may be readily incorporated in conventional, electronic servo mechanisms to automatically control forward movement of the vessel.

A wide variety of control systems may be interposed between the force measuring system of the invention and the vessel propulsion system. In this connection, reference may be made to control systems such as those disclosed in United States Sonnetag Patent 2,273,152, United States Besigk Patent 1,919,611, and United States Silversten Patent 2,373,788, as well as the earlier noted Wanzer Patent 2,987,027.

The force parameter to be measured in connection with a particular pipeline laying operation will depend upon a number of factors including water depth, pipe weight, and pipe stiffness. These factors will determine to a large extent the profile of the pipe, i.e., whether the pipe is supported as a flexed beam under tension as described in United States Lawrence Patent 3,390,532, or as a flexed beam approaching a catenary or some other configuration. Where a pipe is supported in the form of a flexed beam under tension, for example, it will be necessary to maintain the pull exerted by the vessel on the pipeline above a minimum value. Where a pipeline assumes a substantially catenary profile, i.e., where water depths are such that pipe stiffness is no longer a significant factor, it will be necessary for the vessel to exert a minimum pulling force on the pipeline so as to maintain the curvature where it tangentially engages a submerged surface with a least a minimum radius of curvature so as to avoid overstressing the pipeline at this point.

Regardless of the force parameter to be measured, for any given pipeline profile, the limitations on force between a vessel in the gripped portion of a pipeline are determinable and vessel movement and the rate of pipeline lengthening must be correlated so as to maintain these charges within acceptable predetermined limits.

Those actively engaged in pipeline laying and having actual field experience, will appreciate that the theoretical treatment of a suspended pipeline profile as a catenary is, in most instances, an academic approach. Under actual field conditions, and except where a pipeline is being laid in exceptionally deep water, the suspended pipeline profile, i.e., the profile between the lay barge and a submerged surface, will be that of a flexed beam. For some computation purposes, this profile may be treated as if it were a catenary. Nevertheless, because of the inherent stiffness of the pipeline, the profile will technically remain that of a fixed beam.

Summary of advantages and scope of invention

A principal advantage attributable to this invention resides in the concept of controlling movement of a pipe laying vessel in accordance with measurements of force imposed by the vessel on the pipeline being laid. This unique concept provides reliable control information without impairing the pipe laying equipment itself, or making the pipe laying operation awkward and cumbersome. It is applicable not only to the presently disclosed systems, but others, such as, for example, that described in the aforesaid Lawrence Patent 3,390,532.

In practicing this invention in the context of the system disclosed in the aforesaid Lawrence Patent 3,390,532, the tension exerted by the pneumatic tire tensioning device of this invention on a pipeline, may be measured by conventional torque measuring means and utilized as a control parameter for monitoring pipeline operations. By maintaining a desired tensioning force range during pipe laying operations, a desired elevational profile of a suspended pipeline portion may be maintained.

In summary, by way of recapitulation and for the purpose of clarifying terminology, it will be recognized that this invention contemplates the periodic gripping of a generally straight portion of a fixedly axially oriented upper portion of a pipeline. This upper portion may be considered, for example, to comprise the pipeline portion extending through and within, and at times upwardly from the gripping means 110 of FIGURE 1, with the portion of the upper portion actually clamped by gripping means 110 comprising the straight portion of the upper pipeline portion. The length of the upper portion, of course, will vary depending upon whether or not a pipe segment is connected to the upper pipeline portion gripped by the gripping means 509.

In defining the gripped pipeline portion as being generally straight, the term "generally straight" is used in a broad sense to include a pipeline portion which appears to the naked eye to be generally straight but which may be slightly curved due to its being supported on a somewhat downwardly curved pipeline ramp of a floating vessel as described, for example, in the aforesaid Lawrence Patent 3,390,532.

As as been previously indicated, the upper portion of the pipeline is constrained as, for example, by the components of the rigidified derrick or rig 16 so as to fixedly maintain the axial orientation of the upper portion of the pipeline in generally parallel alignment with a direction of generally fixed axial orientation relative to the floating vessel means. This direction, of course, may be considered to be that occupied by the central longitudinal axis of the upper pipeline portion passing through the clamping device 110.

As has been indicated, the gripping means, for example, the clamp 110, is periodically operable to grip the upper pipeline portion so as to prevent movement of a segment such as the segment 30a from the upper pipeline portion toward the generally submerged portion 30b. The pipeline lengthening means comprising, for example, the pipe joint or segment adding means 26 and 27 is operable, while the pipeline portion 30b is gripped between clamp 110, to lengthen the upper portion of the pipeline. Pipeline feeding means, comprising, for example, the traveling block 26 and elevator 27 in combination with the constraining influence of the pipe receiving opening of the gripping mechanism 110 with the slips thereof disengaged, serve to constrain the segment 30a. This constraint insures that the segment 30a, as it is being lowered, moves in generally parallel alignment with the direction of generally fixed axial orientation of the upper pipeline portion relative to the floating vessel means. This constraint also insures that the moving segment 30a is maintained in generally longitudinal alignment with the vertical longitudinal median plane P of the upper portion of the pipeline denoted, for example, in FIGURES 2 and 5.

As has been previously indicated, the pipeline feeding means is operable periodically and alternately with the gripping means 110 to effect the constrained downward feeding of the pipeline.

Force transmitting means, which in one disclosed form may comprise overall derrick 16 and its supporting gear, the force transmitting platform 42, the force transmitting piston 46, and the vessel mounted cylinder 48, serve to transmit force generated by the vessel propulsion units 12 and 14 to the upper pipeline portion. Of course, this generally horizontally directed, transmitted force has at least a vector component generally parallel to the median plane P.

The supporting of the upper pipeline portion, in combination with at least a portion of force transmitted from the submerged pipeline portion to the upper pipeline portion produces a force exerted generally horizontally on the upper pipeline portion from the vessel means. This exerted force, of course, has at least a vector component, i.e., a vector component of the exerted force, which is directed generally parallel to the median plane P. The transmission of force from the submerged portion of the pipeline to the upper portion of the pipeline may be effected through a transition zone of the pipeline disposed generally in the boat well 28.

Detecting means, which in one disclosed form may comprise the mechanism shown in FIGURE 14, may serve as one form of device for detecting at least an indication of the vector component of the generally horizontally directed force which is exerted on the upper pipeline portion, which vector component is generally parallel to the median plane P. This exerted force, of course, may be varied in response to relative movement between the vessel means and the submerged portion of the pipeline.

Control means, for example a system such as that illustrated in FIGURE 14, serve to control generally horizontally directed force generated by the vessel propulsion units. This force, generated by the vessel propulsion units, as is apparent from the foregoing discussion, has a propulsion unit generated vector component generally parallel to the median plane P and is transmitted through the floating vessel 10 to the upper pipeline portion. This control, as has been indicated, tends to maintain at least the vector component of the horizontally directed force which is exerted on the upper pipeline portion, which vector component is directed generally parallel to the median plane P, generally within a predetermined range of force.

During this brief recapitulation, reference has been made by way of example only to the specifically illustrated embodiments. This discussion, of course, is equally applicable, to other embodiments of the invention previously discussed, for example, such as that described in the aforesaid Lawrence Patent 3,390,532.

As will thus be apparent, the invention is concerned with the detection of an indication—not necessarily a direct measurement—of the level of force in a vector component of force exerted on the upper pipeline portion. The vector component here involved is generally parallel to the vertical longitudinal median plane P of the upper portion of the pipeline. The force level of this vector component may be determined directly by force measuring means such as, for example, that illustrated in FIGURE 14.

It will also be apparent that reference to upper and submerged portions of the pipeline are not intended to connote particular points of pipeline material or segments but rather general locations along the pipeline axis which translates as pipelaying proceeds.

As will be recognized in connection with the arrangement shown in the aforesaid Lawrence Patent 3,390,532, the buoyant and partially submerged ramp, which is pivotally connected to a lay vessel, may be either straight or curved downwardly, i.e., curved about a point of curvature beneath the ramp so as to provide a steeper angle at which a pipeline commences its descent into a body of water.

This curvature of the ramp may be effected by having a plurality of straight but mutually inclined ramp sections which provide a polygonal configuration approaching that of a curve which moves downwardly into a body of water as it extends away from a lay vessel. As will be apparent, this downward "curvature" of the buoyant and partially submerged ramp shown in the aforesaid Lawrence Patent 3,390,532, may be effected without altering the basic structure of this ramp except insofar as effecting its downward curvature is concerned. This downward curvature may be particularly desirable in deep water pipe laying operations where a steep angle of entry of a pipeline into a water body is desirable so as to shorten the length of the suspended pipeline portion.

Another significant advantage of the overall invention resides in being able to rigidly, or substantially rigidly, grip a pipeline on the vessel while the vessel is moving during the pipe laying operation and gripping a pipeline and while a force parameter is being measured. This substantially immobilized measuring system provides a unique degree of safety in allowing only such movement of pipe supporting components as are necessary for force measuring purposes. As will be appreciated, where hydraulic or electronic force measuring systems are employed, the degree of movement necessary to transmit force for measuring purposes may be viewed as inconsequential in the context of the overall pipe laying operation.

By way of definition, the term "longitudinal" may be employed with respect to the upper portion of the pipeline which is supported by the floating vessel and the lower portion of the pipeline which is suspended between the floating vessel and the submerged surface upon which the pipeline is being laid. It will here be recognized that the term "longitudinal" is here used in a sense to connote "elongate" but not necessarily absolutely straight.

Also by way of definition, reference may be made to the gripping of an axial length of the upper pipeline portion. This axial length may be considered to comprise a longitudinally extending portion of the upper pipeline portion secured by gripping means such as the mechanism 110 and extending generally away from the submerged pipeline portion. As will be apparent, this axial length will vary in longitudinal extent depending upon the state of elongation of the upper pipeline portion and may be deemed to comprise a whole or part of the entire upper pipeline portion hereinbefore defined.

As will also be appreciated, the terms "central" or "median axis" may be used interchangeably with respect to describing various geometric aspects of the pipeline and its relationship to the pipelaying apparatus.

Another significant advantage of the invention is derived from interposing a control mechanism such as a servo system between the force measuring system and propulsion system of a lay vessel so as to provide automatic control over the forward movement of a lay vessel as the pipe laying proceeds.

Thus, the present invention provides means and methods for feeding tubular structure such as pipe along the bed of a body of water at an optimum angle of support and feed. The present invention overcomes the disadvantages of prior art devices which were limited to laying tubular structure on the bed of only shallow bodies of water. The present invention is particularly useful in laying pipeline on the bed of large, deep bodies of water such as gulfs and lakes. A floating vessel carries the apparatus utilized in practicing the invention and suitable apparatus is used to maintain proper movement of the floating vessel. The proper angle at which the tubular structure is fed into the body of water is determined and set for given water depths and the pull and speed of the floating vessel is coordinated to provide a desired horizontal force acting on such tubular structure thereby maintaining a desired elevational profile between the vessel and the bed of the body of water. Although present use of the invention is adapted for twelve inch pipe being laid in six to seven thousand feet of water, larger diameter pipe may be laid at greater depths if a larger floating vessel is used.

I claim:

1. Apparatus for laying a pipeline on a submerged surface, from floating vessel means including vessel propulsion means, said apparatus comprising:
    (1) support means operable to support a pipeline from said floating vessel means so that,
        (a) a generally longitudinally extending, upper portion of said pipeline, lying with a longitudinal median axis thereof in a generally vertical plane, is supported by said floating vessel means, and
        (b) a generally longitudinally extending submerged portion of said pipeline, connected with, and extending generally longitudinally of, said upper portion, extends downwardly to a submerged surface;
    (2) said support means including,
        (a) constraining means operable to generally fixedly maintain the longitudinal orientation of said axis of said upper portion of said pipeline in generally parallel relation to a linear direction of generally fixed axial orientation relative to said floating vessel means,
        (b) gripping means operable to periodically grip an axial length of said generally fixed axially oriented upper portion of said pipeline to substantially prevent movement, relative to said floating vessel means, of said axial length of said upper portion of said pipeline from said upper portion of said pipeline toward said submerged portion of said pipeline,
        (c) pipeline lengthening means operable, while said gripping means is gripping said axial length of said generally fixedly axially oriented upper portion of said pipeline, to lengthen said upper portion of said pipeline,
        (d) pipeline feeding means operable periodically, and alternately with the gripping of said axial length of said generally fixedly axially oriented upper portion of said pipeline by said gripping means, to constrain said axial length, while in said upper portion of said pipeline, to move relative to said floating vessel means from said upper portion of said pipeline toward said submerged portion of said pipeline while maintaining a longitudinal median axis of said axial length in generally parallel alignment with said direction of generally fixed axial orientation relative to said floating vessel means and in generally coplanar relation with said generally vertical plane of said upper portion of said pipeline, and
        (e) force transmitting means operable to transmit generally horizontally directed force, having at least a vector component generated by said vessel propulsion means and directed generally parallel to said generally vertical plane of said upper portion of said pipeline, from said floating vessel means to said generally fixedly axially oriented upper portion of said pipeline;
    (3) said supporting of said generally fixedly axially oriented upper portion of said pipeline, in combination with at least a portion of force transmitted from said submerged portion of said pipeline to said generally fixedly axially oriented upper portion of said pipeline, exerting a generally horizontally directed force on said generally fixedly axially oriented upper portion of said pipeline, with said thus exerted force having at least a vector component directed generally parallel to said generally vertical plane of said upper portion of said pipeline;
    (4) detecting means operable to detect at least an indication of the magnitude of said vector component of said generally horizontally directed force, exerted on said generally fixedly axially oriented upper portion of said pipeline, which vector component of said exerted force is directed generally parallel to said generally vertical plane and which exerted force may be varied in magnitude in response to relative movement between said vessel means and said submerged portion of said pipeline; and
    (5) control means operable to control generally horizontally directed force
        (a) generated by said vessel propulsion means,
        (b) having a vessel propulsion means generated vector component directed generally parallel to said generally vertical plane of said upper portion of said pipeline, and
        (c) transmitted through said floating vessel means to said generally fixedly axially oriented upper portion of said pipeline
    so as to tend to maintain the magnitude of at least said vector component of said generally horizontally directed force exerted on said upper portion of said pipeline, which vector component is directed generally parallel to said generally vertical plane of said upper portion of said pipeline, generally within a predetermined range of force magnitude.

2. Apparatus as described in claim 1 wherein said detecting means operable to detect at least an indication of the magnitude of said vector component of said generally horizontally directed force exerted on said generally fixedly axially oriented upper portion of said pipeline includes:
    force measuring means operable to directly measure the general magnitude of said vector component of said generally horizontally directed force exerted on said fixedly axially oriented upper portion of said pipeline, which vector component is directed generally parallel to said generally vertical plane of said upper portion of said pipeline.

3. Apparatus as described in claim 2 wherein said control means operable to control generally horizontally directed force generated by said vessel propulsion means includes:
    circuit means operable to control the thrust effect of said vessel propulsion means in response to said measuring by said force measuring means of the general magnitude of said vector component of said generally horizontally directed force exerted on said generally fixedly axially oriented upper portion of said pipeline, which vector component is directed generally parallel to said generally vertical plane of said upper portion of said pipeline during said gripping of said axial length.

4. An apparatus for laying pipeline on a submerged surface, said apparatus comprising:
    floating vessel means;
    pipe-supporting means carried by said vessel means and including gripping means for gripping an upper portion of a pipeline being laid by said vessel means on a submerged surface and extending from said vessel means to said submerged surface, said pipe-supporting means having at least a portion being horizontally movable relative to said vessel means in response to changes in horizontal force exerted by said gripping means on said pipeline;

force-transmitting means mounted for horizontal movement on said vessel means, connected to and horizontally movable with said portion of said pipe-supporting means in response to changes in horizontal force imposed on said pipeline by said gripping means as a result of movement of said vessel means relative to a submerged portion of said pipeline laying on said submerged surface; and measuring means fixedly mounted on said vessel means, operably connected with said force-transmitting means, and operable to measure changes in horizontal force imposed on said force-transmitting means in response to changes in horizontal force imposed by said gripping means on said gripped portion of said pipeline as a result of movement of said vessel means relative to a submerged portion of said pipeline laying on said submerged surface.

5. An apparatus as described in claim 4:
wherein said pipe-supporting means includes a movable pipe-gripping mechanism adapted to grip and support a portion of said pipeline for movement substantially axially of the upper portion of said pipeline; and
wherein said pipe-supporting means further includes:
pipe-engaging means adapted to support the underside of an upper portion of said pipeline generally between said movable griping mechanism and a submerged portion of said pipeline, and
retracting means for selectively moving said pipe-engaging means generally laterally away from said pipeline as said gripping mechanism moves to a position adjacent said pipe-engaging means.

6. An apparatus as described in claim 4:
wherein said measuring means comprises a confined body of liquid; and
wherein said apparatus includes
a piston and cylinder assembly confining said body of fluid and including piston means and cylinder means,
one of said piston means and cylinder means being fixed to, movable with, and comprising at least a portion of, said force-transmitting means, and
the other of said piston means and cylinder means being immovably fixed on and carried by said vessel means.

7. An apparatus for laying pipeline on a submerged surface, said apparatus comprising:
floating vessel means;
propulsion means for moving said floating vessel means through a body of water;
pipe-supporting means carried by said vessel means and including gripping means for gripping an upper portion of a pipeline being laid by said vessel means on a submerged surface and extending from said vessel means to said submerged surface, said pipe-supporting means having at least a portion being horizontally movable relative to said vessel means in response to changes in horizontal force exerted by said gripping means on said pipeline;
means for selectively adjusting said gripping means to cause said gripping means to grip said upper portion of said pipeline at a selectively adjustable, but substantially fixed, axial orientation relative to said floating vessel means;
force-transmitting means mounted for horizontal movement on said vessel means, connected to and horizontally movable with said portion of said pipe-supporting means in response to changes in horizontal force imposed on said pipeline by said gripping means as a result of movement of said vessel means relative to a submerged portion of said pipeline laying on said submerged surface;
measuring means fixedly mounted on said vessel means, operably connected with said force-transmitting means, and operable to measure changes in horizontal force imposed on said force-transmitting means in response to changes in horizontal force imposed by said gripping means on said gripped portion of said pipeline as a result of movement of said vessel means relative to a submerged portion of said pipeline laying on said submerged surface; and
control means operably interposed between said measuring means and said propulsion means and operable to determine movement of said vessel means away from said submerged portion of said pipeline such that force imposed by said gripping means on said gripped portion of said pipeline remains within a predetermined limit.

8. An apparatus for laying pipeline on a submerged surface, said apparatus comprising:
floating vessel means;
propulsion means for moving said floating vessel means through a body of water;
pipe-supporting means carried by said vessel means and including gripping means for gripping an upper portion of a pipeline being laid by said vessel means on a submerged surface and extending from said vessel means to said submerged surface;
means for selectively adjusting said gripping means to cause said gripping means to grip said upper portion of said pipeline at a selectively adjustable, but substantially fixed, axial orientation relative to said floating vessel means;
force-transmitting platform means mounted for horizontal movement on said vessel means, connected to and carrying said pipe-supporting means, and horizontally movable in response to changes in horizontal force imposed on said pipeline by said gripping means as a result of movement of said vessel means relative to a submerged portion of said pipeline laying on said submerged surface;
abutment means for limiting horizontal movement of said platform means;
friction-reducing means supporting said platform means on said vessel means;
measuring means fixedly mounted on said vessel means, operably connected with said platform means and operable to measure changes in horizontal force imposed on said platform means in response to changes in horizontal force imposed by said gripping means on said gripped portion of said pipeline as a result of movement of said vessel means relative to a submerged portion of said pipeline laying on said submerged surface; and
control means operably interposed between said measuring means and said propulsion means and operable to determine movement of said vessel means away from said submerged portion of said pipeline such that force imposed by said gripping means on said gripped portion of said pipeline remains within a predetermined limit.

9. An apparatus as described in claim 8:
wherein said pipe-supporting means includes a movable pipe-gripping mechanism adapted to grip and support a portion of said pipeline for movement substantially axially of the upper portion of said pipeline;
wherein said pipe-supporting means further includes
pipe-engaging means adapted to support the underside of an upper portion of said pipeline generally between said movable gripping mechanism and a submerged portion of said pipeline, and retracting means for selectively moving said pipe-engaging means generally laterally away from said pipeline as said gripping mechanism moves to a position adjacent said pipe-engaging means;

wherein said measuring means comprises a confined body of liquid; and wherein said apparatus includes a piston and cylinder assembly confining said body of fluid and including piston means and cylinder means, said piston means being fixed to, movable with, and comprising at least a portion of, said force-transmitting means, and said cylinder means being movably fixed on and carried by said vessel means.

10. A method of laying a pipeline on a submerged surface from floating vessel means including vessel propulsion means, said method comprising:

(1) supporting a pipeline from said floating vessel means so that,
 (a) a generally longitudinally extending upper portion of said pipeline, lying with a longitudinal median axis thereof in a generally vertical plane, is supported by said floating vessel means, and
 (b) a generally longitudinally extending submerged portion of said pipeline connected with, and extending generally longitudinally of, said upper portion, extends downwardly to a submerged surface;

(2) said supporting of said upper portion of said pipeline being effected by,
 (a) generally fixedly maintaining the longitudinal orientation of said axis of said upper portion of said pipeline in generally parallel relation to a linear direction of generally fixed axial orientation realtive to said floating vessel means,
 (b) periodically gripping an axial length of said generally fixedly axially oriented upper portion of said pipeline to substantially prevent movement, relative to said floating vessel means, of said axial of said upper length portion of said pipeline from said upper portion of said pipeline toward said submerged portion of said pipeline,
 (c) while gripping said axial length of said generally fixedly axially oriented upper portion of said pipeline, lengthening said upper portion of said pipeline,
 (d) periodically, and alternately with said gripping of said axial length of said generally fixedly axially oriented upper portion of said pipeline, constraining said axial length, while in said upper portion of said pipeline, to move relative to said floating vessel means from said upper portion of said pipeline toward said submerged portion of said pipeline while maintaining a longitudinal median axis of said axial length in generally parallel alignment with said direction of generally fixed axial orientation relative to said floating vessel means and in generally coplanar relation with said generally vertical plane of said upper portion of said pipeline, and
 (e) transmitting generally horizontally directed force, having at least a vector component generated by said vessel propulsion means and directed generally parallel to said generally vertical plane of said upper portion of said pipeline, from said floating vessel means to said generally fixedly axially oriented upper portion of said pipeline;

(3) said supporting of said generally fixedly axially oriented upper portion of said pipeline, in combination with at least a portion of force transmitted from said submerged portion of said pipeline to said generally fixedly axially oriented upper portion of said pipeline, exerting a generally horizontally directed force on said generally fixedly axially oriented upper portion of said pipeline, with said thus exerted force having at least a vector component directed generally parallel to said generally vertical plane of said upper portion of said pipeline;

(4) detecting at least an indication of the magnitude of said vector component of said generally horizontally directed force exerted on said generally fixedly axially oriented upper portion of said pipeline, which vector component of said exerted force is directed generally parallel to said generally vertical plane, and which exerted force may be varied in magnitude in response to relative movement between said vessel means and said submerged portion of said pipeline; and (5) controlling generally horizontally directed force
 (a) generated by said vessel propulsion means,
 (b) having a vessel propulsion means generated vector component directed generally parallel to said generally vertical plane of said upper portion of said pipeline, and
 (c) transmitted through said floating vessel means to said generally fixedly axially oriented upper portion of said pipeline so as to tend to maintain the magnitude of at least said vector component of said generally horizontally directed force exerted on said upper portion of said pipeline, which vector component is directed generally parallel to said generally vertical plane of said upper portion of said pipeline, generally within a predetermined range of force magnitude.

11. A method as described in claim 10 wherein said detecting of at least an indication of the magnitude of said vector component of said generally horizontally directed force exerted on said generally fixedly axially oriented upper portion of said pipeline is effected by:

directly measuring the general magnitude of said vector component of said generally horizontally directed force exerted on said fixedly axially oriented upper portion of said pipeline, which vector component is directed generally parallel to said generally vertical plane of said upper portion of said pipeline.

12. A method as described in claim 11 wherein said controlling of generally horizontally directed force generated by said vessel propulsion means is effected in response to said direct measuring of the general magnitude of said vector component of said generally horizontally directed force exerted on said generally fixedly axially oriented upper portion of said pipeline, which vector component is directed generally parallel to said generally vertical plane of said upper portion of said pipeline during said gripping of said axial length.

13. A method of laying a pipeline on a submerged surface, said method comprising:

supporting a pipeline from floating vessel means so that an upper portion of said pipeline is gripped by gripping means carried by said floating vessel means and extends downwardly from said vessel means to a submerged surface;

maintaining said gripped portion of said pipeline at a substantially fixed axial orientation relative to said floating vessel means while measuring changes in horizontal force imposed by said gripping means on said pipeline in response to movement of said vessel means relative to a submerged portion of said pipeline laying on said submerged surface;

adding sections to said pipeline on said vessel means and lowering said added sections toward said submerged surface; and controlling the movement of said vessel means away from said submerged portion of said pipeline in response to said measured changes in horizontal force imposed on said pipeline so as to maintain the force imposed by said gripping means on said pipeline in response to said movement of said vessel means within a predetermined limit.

References Cited

UNITED STATES PATENTS

| 2,659,549 | 11/1953 | Galin | 61—72.3 X |
| 2,910,835 | 11/1959 | Timothy | 61—72.3 |
| 3,214,921 | 11/1965 | Goepfert et al. | 61—72.3 |
| 3,237,438 | 3/1966 | Tesson | 61—72.3 X |
| 3,266,256 | 8/1966 | Postlewaite et al. | 61—72.3 |
| 3,321,925 | 5/1967 | Shaw | 61—72.3 |
| 3,331,212 | 7/1967 | Cox et al. | 61—72.3 |

EARL J. WITMER, Primary Examiner